(12) United States Patent
Salamone et al.

(10) Patent No.: US 7,781,496 B2
(45) Date of Patent: *Aug. 24, 2010

(54) HIGH REFRACTIVE-INDEX, HYDROPHILIC MONOMERS AND POLYMERS, AND OPHTHALMIC DEVICES COMPRISING SUCH POLYMERS

(75) Inventors: Joseph C. Salamone, Boca Raton, FL (US); Jay F. Kunzler, Canandaigua, NY (US); Richard M. Ozark, Solvay, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/273,624

(22) Filed: Nov. 19, 2008

(65) Prior Publication Data

US 2009/0076187 A1 Mar. 19, 2009

Related U.S. Application Data

(60) Continuation of application No. 12/060,322, filed on Apr. 1, 2008, which is a division of application No. 11/139,276, filed on May 27, 2005, now Pat. No. 7,495,061.

(51) Int. Cl.
*G02B 1/04* (2006.01)
*C08F 120/30* (2006.01)
*C08F 16/12* (2006.01)
*C08F 118/02* (2006.01)
*C08F 28/02* (2006.01)
*C08F 220/10* (2006.01)
*C08F 220/18* (2006.01)
*C08F 112/02* (2006.01)
*C08F 112/12* (2006.01)
*C08F 120/18* (2006.01)

(52) U.S. Cl. .................. 523/106; 526/326; 526/313; 526/319; 526/328.5; 526/329.5; 526/346; 526/347.1; 526/329.7

(58) Field of Classification Search .................. 528/271; 526/286, 313, 319, 326, 327, 328, 328.5, 526/329.5, 329.7, 346, 347.1; 523/106
See application file for complete search history.

(56) References Cited

U.S. PATENT DOCUMENTS

| | | | |
|---|---|---|---|
| 4,304,895 A | 12/1981 | Loshaek | |
| 4,528,311 A | 7/1985 | Beard et al. | |
| 5,236,969 A * | 8/1993 | Kunzler et al. | 523/108 |
| 5,674,960 A | 10/1997 | Namdaran et al. | |
| 5,693,095 A | 12/1997 | Freeman et al. | |
| 5,861,031 A | 1/1999 | Namdaran et al. | |
| 5,891,931 A | 4/1999 | LeBoeuf et al. | |
| 5,922,821 A | 7/1999 | LeBoeuf et al. | |
| 6,015,842 A | 1/2000 | LeBoeuf et al. | |
| 6,313,187 B2 | 11/2001 | LeBoeuf et al. | |
| 6,353,069 B1 | 3/2002 | Freeman et al. | |
| 6,541,572 B2 | 4/2003 | LeBoeuf | |
| 6,632,905 B2 | 10/2003 | LeBoeuf | |
| 6,635,732 B2 | 10/2003 | Mentak | |
| 6,673,886 B2 | 1/2004 | Vanderbilt | |
| 6,689,853 B2 | 2/2004 | Campbell et al. | |
| 6,695,880 B1 | 2/2004 | Roffman et al. | |
| 6,703,466 B1 * | 3/2004 | Karakelle et al. | 526/259 |
| 6,723,815 B2 | 4/2004 | Callaghan et al. | |
| 6,737,448 B2 | 5/2004 | Liao | |
| 6,767,934 B1 | 7/2004 | Hodd et al. | |
| 6,767,979 B1 | 7/2004 | Muir et al. | |
| 6,776,932 B1 | 8/2004 | Ilyashenko | |
| 6,852,793 B2 | 2/2005 | Salamone et al. | |
| 6,852,820 B2 | 2/2005 | Mentak | |
| 7,495,061 B2 | 2/2009 | Salamone et al. | |
| 7,714,039 B2 | 5/2010 | Cordova et al. | |
| 7,714,090 B2 | 5/2010 | Iwamoto et al. | |
| 2002/0019492 A1 * | 2/2002 | LeBoeuf | 525/327.3 |
| 2003/0236375 A1 * | 12/2003 | Salamone et al. | 526/307.5 |
| 2009/0076187 A1 | 3/2009 | Salamone et al. | |

FOREIGN PATENT DOCUMENTS

| | | |
|---|---|---|
| EP | 0755952 B1 | 10/1999 |
| JP | 09165422 | 6/1997 |
| WO | WO 9724382 A1 * | 7/1997 |
| WO | WO 99/52570 A1 | 10/1999 |
| WO | WO 99/53347 A1 | 10/1999 |
| WO | WO 99/53348 A1 | 10/1999 |

OTHER PUBLICATIONS

Nishimura et al., "Synthesis of pyridinocrownophanes exhibiting high Ag+-affinity," Heterocycles, 2001, (vol. 54), (Issue. 1), (pp. 123-130).

* cited by examiner

*Primary Examiner*—Vasu Jagannathan
*Assistant Examiner*—Karuna P Reddy
(74) *Attorney, Agent, or Firm*—Joseph Barrera

(57) ABSTRACT

An intraocular lens comprising a polymer that is prepared from a monomer mixture comprising a monomer of formula G-D-Ar (I)

wherein Ar is a $C_6$-$C_{24}$ aromatic group having a hydrophilic substituent, D is a divalent linking group, and G is a reactive functional group selected from the group consisting of acryloyl, acryloyloxy, methacryloyl, methacryloyloxy and mercapto. The polymer has an equilibrium water content of greater than 4.5 percent by weight.

15 Claims, No Drawings

HIGH REFRACTIVE-INDEX, HYDROPHILIC MONOMERS AND POLYMERS, AND OPHTHALMIC DEVICES COMPRISING SUCH POLYMERS

CROSS REFERENCE

This application is a continuation application of U.S. patent application Ser. No. 12/060,322 filed Apr. 1, 2008, which is a divisional application of U.S. patent application Ser. No. 11/139,276 filed May 27, 2005 now U.S. Pat. No. 7,495,061.

BACKGROUND OF THE INVENTION

The present invention relates to high refractive-index, hydrophilic monomers and polymers, and ophthalmic devices comprising such polymers. In particular, the present invention relates to high refractive-index, aromatic-based, hydrophilic monomers and polymers, and ophthalmic devices comprising such polymers.

Since the 1940s ophthalmic devices in the form of intraocular lens ("IOL") implants have been utilized as replacements for diseased or damaged natural ocular lenses. In most cases, an intraocular lens is implanted within an eye at the time of surgically removing the diseased or damaged natural lens, such as for example, in the case of cataracts. For decades, the preferred material for fabricating such intraocular lens implants was poly(methyl methacrylate), which is a rigid, glassy polymer.

Softer, more flexible IOL implants have gained in popularity in more recent years due to their ability to be compressed, folded, rolled or otherwise deformed. Such softer IOL implants may be deformed prior to insertion thereof through an incision in the cornea of an eye. Following insertion of the IOL in an eye, the IOL returns to its original pre-deformed shape due to the memory characteristics of the soft material. Softer, more flexible IOL implants as just described may be implanted into an eye through an incision that is much smaller, i.e., less than 4.0 mm, than that necessary for more rigid IOLs, i.e., 5.5 to 7.0 mm. A larger incision is necessary for more rigid IOL implants because the lens must be inserted through an incision in the cornea slightly larger than the diameter of the inflexible IOL optic portion. Accordingly, more rigid IOL implants have become less popular in the market since larger incisions have been found to be associated with an increased incidence of postoperative complications, such as induced astigmatism.

With recent advances in small-incision cataract surgery, increased emphasis has been placed on developing soft, foldable materials suitable for use in artificial IOL implants. In general, the materials of current commercial IOLs fall into one of three general categories: silicones, hydrophilic acrylics and hydrophobic acrylics.

In general, high water content hydrophilic acrylics, or "hydrogels," have relatively low refractive indices, making them less desirable than other materials with respect to minimal incision size. Low refractive-index materials require a thicker IOL optic portion to achieve a given refractive power. Silicone materials may have a higher refractive index than high-water content hydrogels, but tend to unfold explosively after being placed in the eye in a folded position. Explosive unfolding can potentially damage the corneal endothelium and/or rupture the natural lens capsule and associated zonules. Low glass-transition-temperature hydrophobic acrylic materials are desirable because they typically have a high refractive index and unfold more slowly and more controllably than silicone materials. Unfortunately, low glass-transition-temperature hydrophobic acrylic materials, which contain little or no water initially, tend to absorb water over time and form pockets of water or vacuoles in vivo, causing light reflections or "glistenings." Furthermore, it may be difficult to achieve ideal folding and unfolding characteristics due to the temperature sensitivity of some acrylic polymers.

Because of the noted shortcomings of current polymeric materials available for use in the manufacture of ophthalmic implants, there is a need for stable, biocompatible polymeric materials having desirable physical characteristics and refractive indices.

SUMMARY OF THE INVENTION

An intraocular lens comprising a polymer that is prepared from a monomer mixture comprising a monomer of formula

G-D-Ar  (I)

wherein Ar is a $C_6$-$C_{24}$ aromatic group having a hydrophilic substituent, D is a divalent linking group, and G is a reactive functional group selected from the group consisting of acryloyl, acryloyloxy, methacryloyl, methacryloyloxy and mercapto. The polymer has an equilibrium water content of greater than 4.5 percent by weight.

DETAILED DESCRIPTION OF THE INVENTION

Current commercial acrylic-based ophthalmic products have a water content less than 4.5 percent by weight. These hydrophobic products tend to absorb water over time in vivo and form water vacuoles or "glistenings." In contrast, a polymeric composition comprising residues of hydrophilic monomers of the present invention tend to absorb water rapidly to equilibrium level. Although, applicants do not wish to be bound to any particular theory, it is believed that the absorbed water also is distributed throughout the polymeric composition because of its association with the hydrophilic substituents in the aromatic groups. Therefore, polymeric compositions of the present invention do not present the risk of formation of water vacuoles in vivo.

A hydrophilic aromatic-based monomer that is used to prepare an intraocular lens has a formula of

G-D-Ar  (I)

wherein Ar is a $C_6$-$C_{24}$ aromatic group having at least a hydrophilic substituent, D is a divalent linking group, and G is a reactive functional group. The term "$C_6$-$C_{24}$ aromatic group" means the aromatic group having 6-24 carbon atoms, excluding any carbon atoms in the substituent group.

In one embodiment, Ar is a phenyl group having at least a hydrophilic substituent.

In another embodiment, at least a hydrophilic substituent on the aromatic group is selected from the group consisting of carboxy, alcohols (including monohydric and polyhydric alcohols), and combinations thereof.

In another embodiment, at least a hydrophilic substituent on the aromatic group is selected from the group consisting of —COOH, —CH$_2$—CH$_2$OH, —(CHOH)$_2$—CH$_2$OH, —CH$_2$—CHOH—CH$_2$OH, and combinations thereof.

In still another embodiment, at least a hydrophilic substituent on the aromatic group is a poly(alkylene glycol), such as poly(ethylene glycol) having a formula of —(O—CH$_2$—CH$_2$)$_n$OH, wherein n is an integer and $1 \leq n \leq 100$, preferably $1 \leq n \leq 50$, and more preferably, $1 \leq n \leq 20$.

In a further embodiment, said hydrophilic substituent is selected from the group consisting of carboxamide, dialkyl-substituted carboxamide, amino, alkanolamino, sulfate, substituted sugars, and combinations thereof.

In another aspect, G is a reactive functional group selected from the group consisting of acryloyl, acryloyloxy, methacryloyl, methacryloyloxy and mercapto.

In another aspect, G is selected from the group consisting of acryloyloxy, and methacryloyloxy.

In another aspect, D is a divalent group selected from the group consisting of saturated straight $C_1$-$C_{10}$ hydrocarbons, unsaturated straight $C_1$-$C_{10}$ hydrocarbons, saturated branched $C_3$-$C_{10}$ hydrocarbons, unsaturated branched $C_3$-$C_{10}$ hydrocarbons, saturated cyclic $C_3$-$C_{10}$ hydrocarbons, unsaturated cyclic $C_3$-$C_{10}$ hydrocarbons, and alkyloxy substituents. Preferably, D is a saturated straight $C_1$-$C_{10}$ hydrocarbon divalent group.

In one embodiment, a hydrophilic aromatic-based monomer of the present invention has a formula

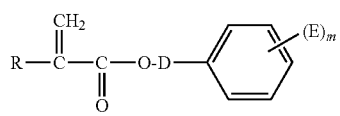

(II)

wherein R is hydrogen or $CH_3$; D is a divalent group selected from the group consisting of saturated straight $C_1$-$C_{10}$ hydrocarbons, unsaturated straight $C_1$-$C_{10}$ hydrocarbons, saturated branched $C_3$-$C_{10}$ hydrocarbons, unsaturated branched $C_3$-$C_{10}$ hydrocarbons, saturated cyclic $C_3$-$C_{10}$ hydrocarbons, unsaturated $C_3$-$C_{10}$ hydrocarbons, and alkoxy substituents; E is selected from the group consisting of carboxy, carboxamide, and alcohol (including monohydric and polyhydric alcohols) substituents; and m is an integer from 1 to, and including, 5. Preferably, m is 1 or 2.

In one embodiment, a hydrophilic aromatic-based monomer of the present invention has a formula

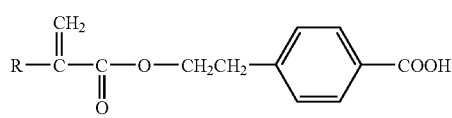

(III)

wherein R is either hydrogen or $CH_3$.

In another embodiment, a hydrophilic aromatic-based monomer of the present invention has a formula

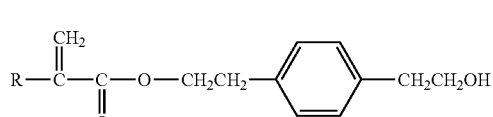

(IV)

wherein R is hydrogen or $CH_3$.

In still another embodiment, a hydrophilic aromatic-based monomer of the present invention has a formula

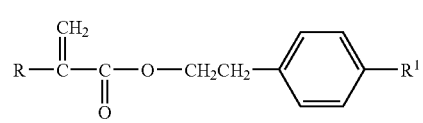

(V)

wherein $R^1$ is —C(O)O—$NH_2$ or —C(O)—N($CH_3$)$_2$.

Hydrophilic, aromatic-based monomers of the present invention can be used to produce homopolymers or copolymers having high refractive indices, such as about 1.4 or greater. In some embodiments, the homopolymers or copolymers have refractive indices in the range from about 1.4 to about 1.7; in some other embodiments, from about 1.45 to about 1.6.

Alternatively, a hydrophilic, aromatic-based monomer of the present invention can be copolymerized with another hydrophilic or hydrophobic monomer to provide a polymer having high refractive index, such as about 1.4 or greater.

Non-limiting examples of other hydrophilic monomers useful for polymerization with one or more hydrophilic, aromatic-based monomers of the present invention include N,N-dimethylacrylamide, glycerol methacrylate, N-vinylpyrrolidone, and 2-hydroxyethyl methacrylate. Preferably, N,N-dimethylacrylamide is used for increased hydrophilicity.

Non-limiting examples of other hydrophobic monomers useful for polymerization with one or more hydrophilic, aromatic-based monomers of the present invention include $C_1$-$C_{10}$ alkyl methacrylates (e.g., methyl methacrylate, ethyl methacrylate, propyl methacrylate, butyl methacrylate, octyl methacrylate, or 2-ethylhexyl methacrylate; preferably, methyl methacrylate to control mechanical properties), $C_1$-$C_{10}$ alkyl acrylates (e.g., methyl acrylate, ethyl acrylate, propyl acrylate, or hexyl acrylate; preferably, ethyl acrylate to control mechanical properties), $C_6$-$C_{40}$ arylalkyl acrylates (e.g., phenylethyl acrylate, benzyl acrylate, 3-phenylpropyl acrylate, 4-phenylbutyl acrylate, 5-phenylpentyl acrylate, 8-phenyloctyl acrylate, or 2-phenylethoxy acrylate; preferably, 2-phenylethyl acrylate to increase refractive index), and $C_6$-$C_{40}$ arylalkyl methacrylates (e.g., 2-phenylethyl methacrylate, 3-phenylpropyl methacrylate, 4-phenylbutyl methacrylate, 5-phenylpentyl methacrylate, 8-phenyloctyl methacrylate, 2-phenoxyethyl methacrylate, 3,3-diphenylpropyl methacrylate, 2-(1-naphthylethyl)methacrylate, benzyl methacrylate, or 2-(2-naphthylethyl)methacrylate; preferably, phenylethyl methacrylate to increase refractive index). Other suitable hydrophobic monomers include silicon-containing monomers, especially aromatic-based silicon-containing monomer, such as 3-methacryloyloxypropyldiphenylmethylsilane.

The hydrophilic, aromatic-based monomer having Formula (III) can be produced by a method illustrated in Scheme 1.

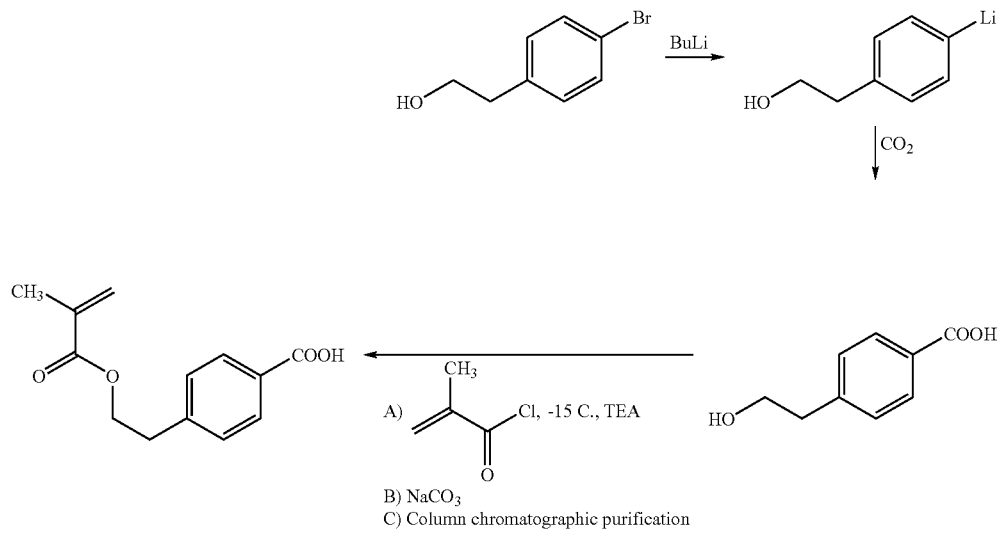

The hydrophilic, aromatic-based monomer having Formula (IV) can be produced by a method illustrated in Scheme 2.

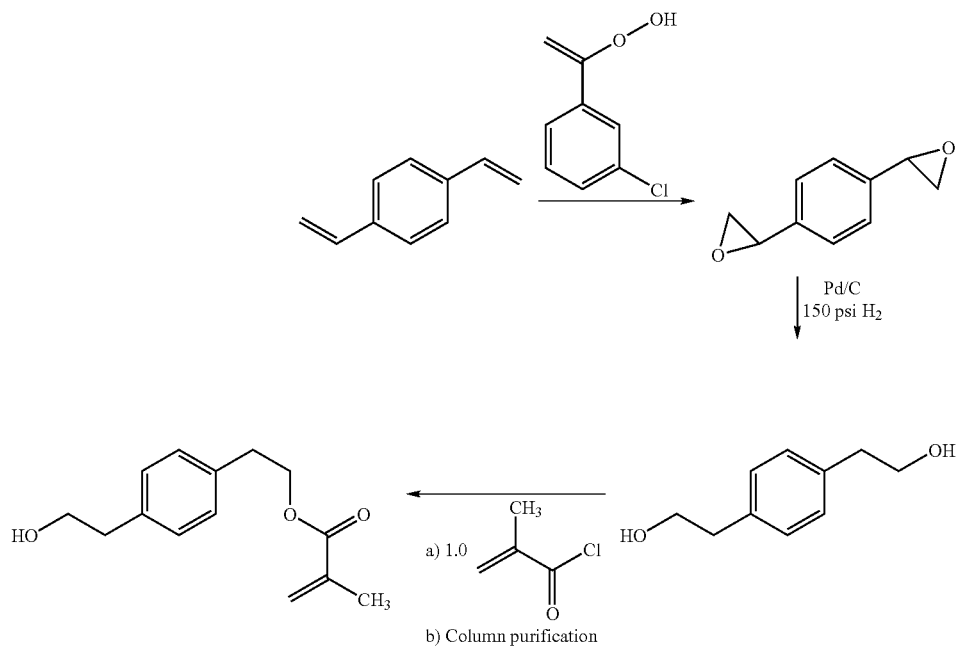

Homopolymers of hydrophilic, aromatic-based monomers of the present invention and copolymers comprising one or more hydrophilic, aromatic-based monomers of the present invention and at least another monomer can be produced by free radical polymerization. For example, a copolymer of the hydrophilic, aromatic-based monomer having Formula (III) and 2-phenylethyl methacrylate (or 2-phenylethyl acrylate) is produced according to the following reaction, in the presence of a thermal polymerization initiator (such as one selected from the list of thermal polymerization initiators disclosed below) at a temperature in the range from about 20° C. to about 120° C. Alternatively, the reaction can be carried out in the presence of a photoinitiator selected from the list of photoinitiators disclosed below at a temperature in the range from about 20° C. to about 60° C.

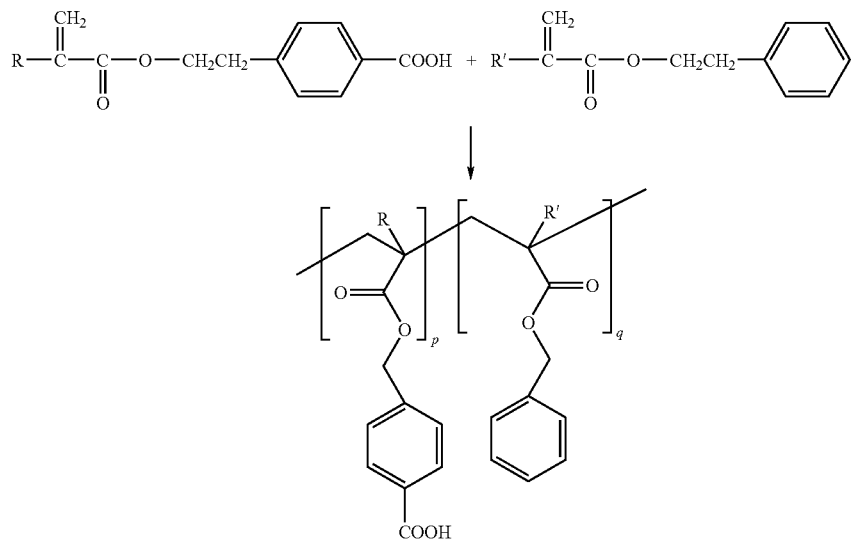

wherein R and R' are independently selected from the group consisting of hydrogen and $CH_3$; p and q are independently selected integers greater than 1 to provide a desired molar ratio of the monomers and a desired molecular weight. For example, p and q can be in the range from about 1 to about 100,000, or from 1 to about 50,000, or from 1 to 20,000.

Another exemplary copolymer comprising the monomer having Formula (IV); N,N-dimethylacrylamide; and phenylethyl methacrylate (or phenylethyl acrylate) is made according to the following reaction, in the presence of a thermal polymerization initiator (such as one selected from the list of thermal polymerization initiators disclosed below) at a temperature in the range from about 20° C. to about 120° C. Alternatively, the reaction can be carried out in the presence of a photoinitiator selected from the list of photoinitiators disclosed below at a temperature in the range from about 20° C. to about 60° C.

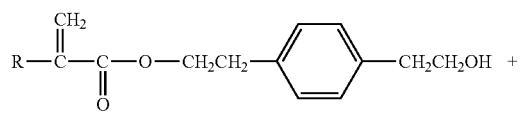

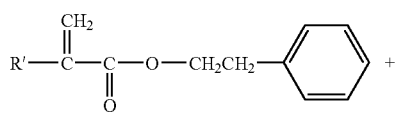

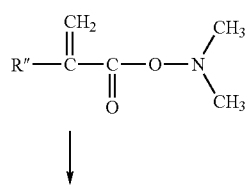

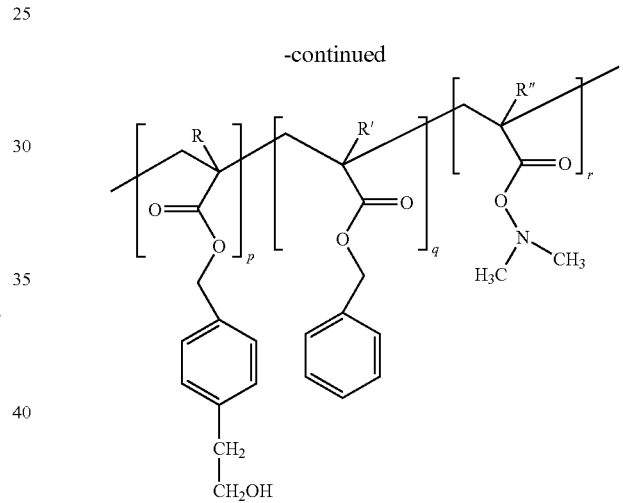

wherein R, R', and R" are independently selected from the group consisting of hydrogen and $CH_3$; p, q, and r are independently selected integers greater than 1 to provide a desired molar ratio of the monomers and a desired molecular weight. For example, p, q, and r can be in the range from about 1 to about 100,000, or from 1 to about 50,000, or from 1 to 20,000.

A formulation for the production of a polymer comprising a hydrophilic, aromatic-based monomer of the present invention can include one or more crosslinking agents in an amount less than about 10 percent by weight of the weight of all monomers and crosslinking agents, if desired. In one embodiment, the crosslinking agents are present in an amount less than about 5 percent by weight.

Non-limiting examples of suitable crosslinking agents include ethylene glycol dimethacrylate ("EGDMA"); diethylene glycol dimethacrylate; ethylene glycol diacrylate; triethylene glycol dimethacrylate; triethylene diacrylate; allyl methacrylates; allyl acrylates; 1,3-propanediol dimethacrylate; 1,3-propanediol diacrylate; 1,6-hexanediol dimethacrylate; 1,6-hexanediol diacrylate; 1,4-butanediol dimethacrylate; 1,4-butanediol diacrylate; trimethylolpropane trimethacrylate ("TMPTMA"); glycerol trimethacrylate;

poly(ethyleneoxide mono- and di-acrylate); N,N'-dihydroxyethylene bisacrylamide; diallyl phthalate; triallyl cyanurate; divinylbenzene; ethylene glycol divinyl ether; N,N-methylene-bis-(meth)acrylamide; divinylbenzene; divinylsulfone; and the like.

Although not required, homopolymers or copolymers within the scope of the present invention may optionally have one or more strengthening agents added prior to polymerization, preferably in quantities of less than about 80 weight percent but more typically from about 20 to about 60 weight percent. Non-limiting examples of suitable strengthening agents are described in U.S. Pat. Nos. 4,327,203; 4,355,147; and 5,270,418; each of which is incorporated herein in its entirety by reference. Specific examples, not intended to be limiting, of such strengthening agents include cycloalkyl acrylates and methacrylates; e.g., tert-butylcyclohexyl methacrylate and isopropylcyclopentyl acrylate.

One or more ultraviolet ("UV") light absorbers may optionally be added to the copolymers prior to polymerization in quantities less than about 5 percent by weight. Suitable UV light absorbers for use in the present invention include for example, but are not limited to, β-(4-benzotriazoyl-3-hydroxyphenoxy)ethyl acrylate; 4-(2-acryloxyethoxy)-2-hydroxybenzophenone; 4-methacryloyloxy-2-hydroxybenzophenone; 2-(2'-methacryloyloxy-5'-methylphenyl) benzotriazole; 2-(2'-hydroxy-5'-methacryloxyethylphenyl)-2H-benzotriazole; 2-[3'-tert-butyl-2'-hydroxy-5'-(3"-methacryloyloxypropyl)phenyl]-5-chlorobenzotriazole; 2-(3'-tert-butyl-5'-(3"-dimethylvinylsilylpropoxy)-2'-hydroxyphenyl]-5-methoxybenzotriazole; 2-(3'-allyl-2'-hydroxy-5'-methylphenyl)benzotriazole; 2-[3'-tert-butyl-2'-hydroxy-5'-(3"-methacryloyloxypropoxy)phenyl]-5-methoxybenzotriazole, and 2-[3'-tert-butyl-2'-hydroxy-5'-(3"-methacryloyloxypropoxy)phenyl]-5-chlorobenzotriazole. Preferably, the UV light absorber also has a polymerizable functional group. In one embodiment, the preferred UV light absorbers are β-(4-benzotriazoyl-3-hydroxyphenoxy)ethyl acrylate and 2-[3'-tert-butyl-2'-hydroxy-5'-(3"-methacryloyloxypropoxy)phenyl]-5-chlorobenzotriazole.

One or more suitable free radical polymerization initiators may be desirably added to the copolymers of the present invention. These initiators include thermal polymerization initiators and photopolymerization initiators. Thermal polymerization initiators include organic peroxy compounds and azobis(organonitrile) compounds. Non-limiting examples of suitable organic peroxy compounds include peroxymonocarbonate esters, such as tert-butylperoxy isopropyl carbonate; peroxydicarbonate esters, such as di(2-ethylhexyl) peroxydicarbonate, di(sec-butyl)peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as t-butylperoxy pivalate, t-butylperoxy octylate, and t-butylperoxy isobutyrate; methylethylketone peroxide; and acetylcyclohexane sulfonyl peroxide. Non-limiting examples of suitable azobis(organonitrile) compounds include azobis (isobutyronitrile); 2,2'-azobis(2,4-dimethylpentanenitrile); 1,1'-azobiscyclohexanecarbonitrile; and azobis(2,4-dimethylvaleronitrile); and mixtures thereof. Preferably, such an initiator is employed in a concentration of approximately 0.01 to 1 percent by weight of the total monomer mixture.

Representative UV photopolymerization initiators include those known in the field, such as the classes of benzophenone and its derivatives, benzoin ethers, and phosphine oxides. Some non-limiting examples of these initiators are benzophenone; 4,4'-bis(dimethylamino)benzophenone; 4,4'-dihydroxybenzophenone; 2,2-diethoxyacetophenone; 2,2-dimethoxy-2-phenylacetophenone; 4-(dimethylamino) benzophenone; 2,5-dimethylbenzophenone; 3,4-dimethybenzophenone; 4'-ethoxyacetophenone; 3'-hydroxyacetophenone; 4'-hydroxyacetophenone; 3-hydroxybenzophenone; 4-hydroxybenzophenone; 1-hydroxycyclohexyl phenyl ketone; 2-hydroxy-2-methylpropiophenone; 2-methylbenzophenone; 3-methylbenzophenone; 4'-phenoxyacetophenone; 2-methyl-4'-(methylthio)-2-morpholinopropiophenone; benzoin methyl ether; benzoin ethyl ether; diphenyl(2,4,6-trimethylbenzoyl)phosphine oxide. These initiators are commercially available. Other photo polymerization initiators are known under the trade names Darocur™ and Irgacure™, such as Darocur™ 1173 (2-hydroxy-2-methyl-1-phenyl-1-propanone), Irgacure™ 651 (2,2-dimethoxy-2-phenylacetophenone), Irgacure™ 819 (phenyl-bis(2,4,6-trimethyl benzoyl)phosphine oxide), and Irgacure™ 184 (1-hydroxy cyclohexyl phenyl ketone) from Ciba-Geigy, Basel, Switzerland.

The polymeric compositions of the present invention are transparent, flexible, of relatively high refractive index and of relatively high elongation. The polymeric compositions of the present invention with the desirable physical properties noted above are particularly useful in the manufacture of ophthalmic devices such as but not limited to relatively thin, foldable IOLs, contact lenses, corneal rings, corneal inlays, and keratoprostheses. Furthermore, absorbed water in the polymeric compositions of the present invention does not tend to form water vacuoles. Thus, the polymeric compositions of the present invention are more advantageously used in ophthalmic device applications than prior-art acrylic compositions.

IOLs having relatively thin optic portions are critical in enabling a surgeon to minimize surgical incision size. Keeping the surgical incision size to a minimum reduces intraoperative trauma and postoperative complications. A relatively thin IOL optic portion is also critical for accommodating certain anatomical locations in the eye such as the anterior chamber and the ciliary sulcus. IOLs may be placed in the anterior chamber for increasing visual acuity in either aphakic or phakic eyes, or placed in the ciliary sulcus for increasing visual acuity in phakic eyes.

The polymeric compositions of the present invention have the flexibility required to allow implants manufactured from the same to be folded or deformed for insertion into an eye through the smallest possible surgical incision, i.e., 3.5 mm or smaller.

In general, a method of making an ophthalmic device comprises: (a) providing a polymerizable composition comprising a hydrophilic, aromatic-based monomer of the present invention; and (b) curing the polymerizable composition at a temperature and for a time sufficient to produce the ophthalmic device. The curing can be carried out such that the polymerizable composition is solidified into the final form of the ophthalmic device or such that a solid article is first produced and the ophthalmic device is shaped therefrom.

In one embodiment, the method of making an ophthalmic device comprises: (a) providing a polymerizable composition comprising a hydrophilic, aromatic-based monomer; (b) disposing the polymerizable composition in a mold cavity, which forms a shape of the ophthalmic device; and (c) curing the polymerizable composition under a condition and for a time sufficient to form the ophthalmic device; wherein the hydrophilic, aromatic-based monomer has a formula of G-D-Ar         (I)

wherein Ar is a $C_6$-$C_{24}$ aromatic group having at least a hydrophilic substituent, D is a divalent linking group, and G is a reactive functional group.

In one embodiment, at least a hydrophilic substituent on the aromatic group is selected from the group consisting of carboxy, carboxamide, alcohol (including monohydric and polyhydric alcohols) substituents, and combinations thereof.

In another embodiment, at least a hydrophilic substituent on the aromatic group is selected from the group consisting of —COOH, —CH$_2$—CH$_2$OH, —(CHOH)$_2$—CH$_2$OH, —CH$_2$—CHOH—CH$_2$OH, and combinations thereof.

In still another embodiment, at least a hydrophilic substituent on the aromatic group is a poly(alkylene glycol), such as poly(ethylene glycol) having a formula of —(O—CH$_2$—CH$_2$)$_n$OH, wherein n is an integer and $1 \leq n \leq 100$, preferably $1 \leq n \leq 50$, and more preferably, $1 \leq n \leq 20$.

In a further embodiment, said hydrophilic substituent is selected from the group consisting of carboxamide, dialkyl-substituted carboxamide, amino, alkanolamino, sulfonate, phosphonate, sulfate, phosphate, ureido, substituted sugars, and combinations thereof.

In yet another embodiment, the polymerizable composition also comprises a crosslinking agent, or a polymerization initiator, or both. The polymerization initiator is preferably a thermal polymerization initiator. The curing can be carried out at an elevated temperature such as in the range from about ambient temperature to about 120° C. In some embodiments, the curing is carried out at a temperature from slightly higher than ambient temperature to about 100° C. A time from about 1 minute to about 48 hours is typically adequate for the curing.

In another embodiment, the method of making an ophthalmic device comprises: (a) providing polymerizable composition comprising a hydrophilic, aromatic-based monomer; (b) casting the polymerizable composition under a condition and for a time sufficient to form a solid block; and (c) shaping the block into the ophthalmic device; wherein the hydrophilic, aromatic-based monomer has a formula of G-D-Ar  (I)

wherein Ar is a $C_6$-$C_{24}$ aromatic group having at least a hydrophilic substituent, D is a divalent linking group, and G is a reactive functional group.

In one embodiment, said at least a hydrophilic substituent is selected from the group consisting of carboxy, alcohols (including monohydric and polyhydric alcohols), and combinations thereof.

In another embodiment, at least a hydrophilic substituent on the aromatic group is selected from the group consisting of —COOH, —CH$_2$—CH$_2$OH, —(CHOH)$_2$—CH$_2$OH, —CH$_2$—CHOH—CH$_2$OH, and combinations thereof.

In still another embodiment, at least a hydrophilic substituent on the aromatic group is a poly(alkylene glycol), such as poly(ethylene glycol) having a formula of —(O—CH$_2$—CH$_2$)$_n$OH, wherein n is an integer and $1 \leq n \leq 100$, preferably $1 \leq n \leq 50$, and more preferably, $1 \leq n \leq 20$.

In a further embodiment, said hydrophilic substituent is selected from the group consisting of carboxamide, dialkyl-substituted carboxamide, amino, alkanolamino, sulfonate, phosphonate, sulfate, phosphate, ureido, substituted sugars, and combinations thereof.

In yet another embodiment, the polymerizable composition also comprises a crosslinking agent, or a polymerization initiator, or both. The polymerization initiator is preferably a thermal polymerization initiator. The casting can be carried out at an elevated temperature such as in the range from about 20° C. to about 120° C. In some embodiments, the casting is carried out at a temperature from slightly higher than ambient temperature to about 100° C. A time from about 1 minute to about 48 hours is typically adequate for the polymerization. The shaping can comprise cutting the solid block into wafers, and lathing or machining the wafers into the shape of the final ophthalmic device.

Ophthalmic medical devices manufactured using polymeric compositions of the present invention are used as customary in the field of opthalmology. For example, in a surgical cataract procedure, an incision is placed in the cornea of an eye. Through the corneal incision the cataractous natural lens of the eye is removed (aphakic application) and an IOL is inserted into the anterior chamber, posterior chamber or lens capsule of the eye prior to closing the incision. However, the subject ophthalmic devices may likewise be used in accordance with other surgical procedures known to those skilled in the field of opthalmology.

While specific embodiments of the present invention have been described in the foregoing, it will be appreciated by those skilled in the art that many equivalents, modifications, substitutions, and variations may be made thereto without departing from the spirit and scope of the invention as defined in the appended claims.

What is claimed is:

1. An intraocular lens comprising a polymer that is prepared from a monomer mixture comprising a monomer of formula G-D-Ar  (I)

wherein Ar is a $C_6$-$C_{24}$ aromatic group having a hydrophilic substituent selected from the group consisting of —COOH, —CH$_2$—CH$_2$OH, —(CHOH)$_2$—CH$_2$OH, —CH$_2$—CHOH—CH$_2$OH, —C(O)O—NH$_2$, —C(O)—N(CH$_3$)$_2$, and —(O—CH$_2$—CH$_2$)$_n$—OH wherein $1 \leq n \leq 20$, and D is a divalent saturated straight $C_1$-$C_{10}$ hydrocarbon or alkyloxy linking group, and G is a reactive functional group selected from the group consisting of acryloyl, acryloyloxy, methacryloyl, methacryloyloxy and mercapto, and a hydrophobic alkyl monomer selected from $C_1$-$C_{10}$ alkyl methacrylates or $C_1$-$C_{10}$ alkyl acrylates, wherein the polymer has a refractive index of from 1.4 to 1.7.

2. The intraocular lens of claim 1, wherein the hydrophilic substituent is selected from the group consisting of —COOH, —CH$_2$—CH$_2$OH, —(CHOH)$_2$—CH$_2$OH, —CH$_2$—CHOH—CH$_2$OH, —C(O)O—NH$_2$, and —C(O)—N(CH$_3$)$_2$.

3. The intraocular lens of claim 1, wherein said hydrophilic substituent is —(O—CH$_2$—CH$_2$)$_n$OH, wherein n is an integer and $1 \leq n \leq 20$.

4. The intraocular lens of claim 1, wherein the monomer of formula I is

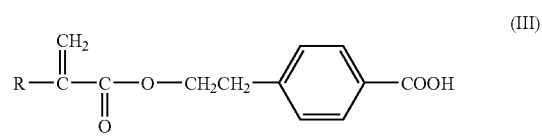

(III)

wherein R is hydrogen or CH$_3$.

5. The intraocular lens of claim 1, wherein the monomer of formula I is

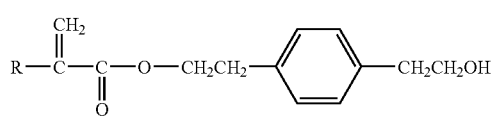
(IV)

wherein R is hydrogen or $CH_3$.

6. The intraocular lens of claim 1, wherein the monomer of formula I is

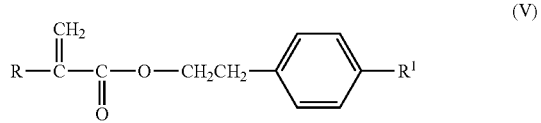
(V)

wherein R is hydrogen or $CH_3$, and $R^1$ is $-C(O)O-NH_2$ or $-C(O)-N(CH_3)_2$.

7. The intraocular lens of claim 3 wherein D is alkyloxy.

8. The intraocular lens of claim 3 wherein n is 1.

9. The intraocular lens of claim 1 wherein the monomer mixture further comprises a hydrophobic monomer selected from $C_6$-$C_{40}$ arylalkylmethacrylates or $C_6$-$C_{40}$ arylalkylacrylates.

10. The intraocular lens of claim 9 wherein the $C_6$-$C_{40}$ arylalkylmethacrylates or $C_6$-$C_{40}$ arylalkylacrylates are selected from the group consisting of 2-phenylethyl methacrylate, 3-phenylpropyl methacrylate, 4-phenylbutyl methacrylate, 2-phenoxyethyl methacrylate, benzyl methacrylate, phenylethyl acrylate, benzyl acrylate, 3-phenylpropyl acrylate, 4-phenylbutyl acrylate and 2-phenylethoxy acrylate.

11. The intraocular lens of claim 1 wherein the $C_1$-$C_{10}$ alkyl methacrylates or $C_1$-$C_{10}$ alkyl acrylates are selected from the group consisting of methyl acrylate, ethyl acrylate, propyl acrylate, hexyl acrylate, methyl methacrylate, ethyl methacrylate, propyl methacrylate and butyl methacrylate.

12. The intraocular lens of claim 10 wherein the $C_1$-$C_{10}$ alkyl methacrylates or $C_1$-$C_{10}$ alkyl acrylates are selected from the group consisting of methyl acrylate, ethyl acrylate, propyl acrylate, hexyl acrylate, methyl methacrylate, ethyl methacrylate, propyl methacrylate and butyl methacrylate.

13. An intraocular lens comprising a polymer that is prepared from a monomer mixture comprising:

a monomer of formula $$G-D-Ar \qquad (I)$$

wherein Ar is a $C_6$-$C_{24}$ aromatic group having a hydrophilic substituent selected from the group consisting of $-COOH$, $-CH_2-CH_2OH$, $-(CHOH)_2-CH_2OH$, $-CH_2-CHOH-CH_2OH$, $-C(O)O-NH_2$, $-C(O)-N(CH_3)_2$, and $-(O-CH_2-CH_2)_n-OH$ wherein $1 \leq n \leq 20$, and D is a divalent alkyloxy linking group, and G is a reactive functional group selected from the group consisting of acryloyl, acryloyloxy, methacryloyl, methacryloyloxy and mercapto, a hydrophobic alkyl monomer selected from $C_1$-$C_{10}$ alkyl methacrylates or $C_1$-$C_{10}$ alkyl acrylates, and a hydrophobic $C_6$-$C_{40}$ arylalkylmethacrylate or $C_6$-$C_{40}$ arylalkylacrylate selected from the group consisting of 2-phenylethyl methacrylate, 3-phenylpropyl methacrylate, 4-phenylbutyl methacrylate, 2-phenoxyethyl methacrylate, benzyl methacrylate, phenylethyl acrylate, benzyl acrylate, 3-phenylpropyl acrylate, 4-phenylbutyl acrylate and 2-phenylethoxy acrylate; and wherein the polymer has a refractive index of from 1.4 to 1.7.

14. The intraocular lens of claim 13 wherein said hydrophilic substituent is $-(O-CH_2-CH_2)_n OH$, wherein n is an integer and $1 \leq n \leq 20$.

15. The intraocular lens of claim 13 wherein the $C_1$-$C_{10}$ alkyl methacrylates or $C_1$-$C_{10}$ alkyl acrylates are selected from the group consisting of methyl acrylate, ethyl acrylate, propyl acrylate, hexyl acrylate, methyl methacrylate, ethyl methacrylate, propyl methacrylate and butyl methacrylate.

\* \* \* \* \*